(12) United States Patent
Geeraert

(10) Patent No.: US 6,307,512 B1
(45) Date of Patent: Oct. 23, 2001

(54) DUAL BAND ANTENNA FOR A HANDSET

(75) Inventor: Francis Geeraert, Valby (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/461,619

(22) Filed: Dec. 15, 1999

(30) Foreign Application Priority Data

Dec. 22, 1998 (GB) .................................................. 9828364

(51) Int. Cl.[7] .................................................. H01Q 1/24
(52) U.S. Cl. .................................. 343/702; 343/700 MS; 343/846
(58) Field of Search ............................ 343/700 MS, 702, 343/74 G, 752, 767, 770, 846, 848, 866; H01Q 1/24, 1/38

(56) References Cited

U.S. PATENT DOCUMENTS

| | | | |
|---|---|---|---|
| 4,641,366 | * 2/1987 | Yokoyama et al. | 343/702 |
| 5,365,246 | * 11/1994 | Rasinger et al. | 343/702 |
| 5,526,003 | * 6/1996 | Ogawa et al. | 343/700 MS |
| 5,644,319 | * 7/1997 | Chen et al. | 343/702 |
| 5,764,190 | 6/1998 | Murch et al. | 343/702 |
| 5,850,198 | * 12/1998 | Lindenmeier et al. | 343/713 |
| 6,025,802 | * 2/2000 | Eggleston et al. | 343/700 MS |

FOREIGN PATENT DOCUMENTS

| | | |
|---|---|---|
| 0604338 | 6/1994 | (EP) . |
| 2288284 | 10/1995 | (GB) . |

OTHER PUBLICATIONS

C. R. Rowell, et al, IEEE Transactions on Antennas and Propagatio pp. 596–6034/98.

* cited by examiner

Primary Examiner—T Phan
(74) Attorney, Agent, or Firm—Perman & Green, LLP

(57) ABSTRACT

An antenna device for a handportable phone having a first conducting layer acting as resonator plane, a second conducting layer arranged substantially in parallel with the first conducting layer and acting as ground plane for the antenna device, and feeding means connected to said first and the second conducting layer for feeding an RF signal to the antenna device. The first conducting layer is provided as a radiating pattern having a common frequency part coherent with two further parts where said common frequency part in combination with said two further parts defines a first radiating element and a second radiating element, respectively. Capacitive couplings between the first and the second conducting areas adjacent to the crossing areas between said common frequency part and the respective one of said two further parts.

8 Claims, 9 Drawing Sheets

DUAL BAND ANTENNA FOR A HANDSET

BACKGROUND OF THE INVENTION

The invention relates to a dual band antenna for a handset. Such a antenna includes a metallic plate or layer acting as ground plane for the antenna, a resonator plate or layer acting as radiating element(s), and a feeding point supplying the signal to the antenna. When the ground plane and the resonator plane are electrically coupled the feeding point will be placed in a position where the antenna is matched to the RF output of the handset. Such antennas are known as Planar Inverted F-Antennas (PIFA).

Until a few year ago all phones for cellular communication were equipped with an extendable antenna element, as known from e.g. the phone sold under the tradename Nokia 2110™. Later on this extendable antenna element were substituted by an external helix antenna, as known from e.g. the phone sold under the tradename Nokia 6110™. Recently the applicant has launched a phone sold under the tradename Nokia 8810™ and this phone includes an internal antenna based on the PIFA concept. The antenna is a so-called single band antenna and the present version it is adapted for GSM in the 900 MHz band (uplink 890–915 MHz and downlink 935–960 MHz). The antenna element will have an electric length corresponding to a quarter wavelength and placing a dielectric between the ground a resonator plane the over physical dimensions is reduced. The overall dimensions of the PIFA are reduced to 32×20×4 mm.

WO 95/24746 describes an internal antenna having a dielectric body coated with a metallic layer on two substantially parallel surfaces. This antenna is a single band antenna for the GSM 900 MHz band only. Basically a plastic body is molded and with metal. Afterwards a pattern is created in the metallic layer by removing parts of the coated surfaces by milling. This concept has been used in the phone marketed by Hagenuk under the tradename Global Handy™.

U.S. Pat. No. 5,764,190 describes a capacity loaded PIFA according to which an extra plate is interposed in between the ground plane and the radiating element. This requires that a two-shot molding process be used in addition to several coating processes.

A letter by C. R. Rowell and R. D. Murch, "A Compact PIFA suitable for dual frequency 900/1800 MHz operation", is published in IEEE Transactions on Antennas and Propagation, April 1998, Volume 46, Number 4. This letter is written by the inventors mentioned in U.S. Pat. No. 5,764,190, and describes further improvement of the three layered antenna concept. The improvement includes providing of a longitudinal slit in the resonator layer in order to obtain two radiating elements. The RF signal is fed to the radiating elements via the intermediate plate.

A letter by Z. D. Lui and P. S. Hall, "Dual-Frequency Planar Inverted-F Antenna", is published in IEEE Transactions on Antennas and Propagation, October 1997, Volume 45, Number 10. This letter describes a number of solutions—one of these having a rectangular patch for the 900 MHz band. This patch is provided with a L-shaped slot separating one quarter of the 900 MHz band for acting as resonating element in 1800 MHz band. The two resonating elements are interconnected in the bottom of the slot the common feeding point is provided in this interconnection. Furthermore the two resonating elements are shortened in this interconnection by means of a number of shorting pins. Hereby the coupling between the two radiating elements is reduced.

SUMMARY OF THE INVENTION

An object of the invention is to provide a dual band antenna for a handset having a form that can be integrated into the per se known type of handset cabinets.

This purpose is obtained by an antenna device having a first conducting layer acting as resonator plane, a second conducting layer arranged substantially in parallel with the first conducting layer and acting as ground plane for the antenna device, and feeding means connected to said first and the second conducting layer for feeding an RF signal to the antenna device. The first conducting layer is provided as a radiating pattern having a common frequency part coherent with two further parts where said common frequency part in combination with said two further parts defines a first radiating element and a second radiating element, respectively. Capacitive couplings between the first and the second conducting areas adjacent to the crossing areas between said common frequency part and the respective one of said two further parts. Hereby the common frequency part carries currents from both frequency bands and thereby constitutes a part of the two radiating elements of the antenna.

Preferably the antenna device according to the invention has a dielectric body on which the first conducting layer is coated onto. By manufacturing the dielectric body in an injection molding process including two shots the manual handling of the antenna device is minimized during manufacture. The material used in one of the two injection molding shots is a resin repelling metal in a subsequent coating process, while the material used in the other shot is a resin to which metal in the subsequent coating process adhere.

The dielectric body may advantageously be provided with coupling means for establishing a releasable interconnection with a separate metal body acting as the second conducting layer of the device.

The feeding means may advantageously include a bore through the dielectric body as a connection via connecting the first conducting layer to a connection pad on the rear side of the dielectric body.

Preferably the capacitive coupling between said first and said second conducting layers is partly obtained by reducing the distance between said first conducting layer and said second conducting layer.

The dielectric body is provided with releasable interconnection with a separate metal body acting as the second conducting layer of the device. The metal body is provided with a stepwise raised part to establish the capacitive coupling.

DETAILED DESCRIPTION OF THE INVENTION

Figure 1:
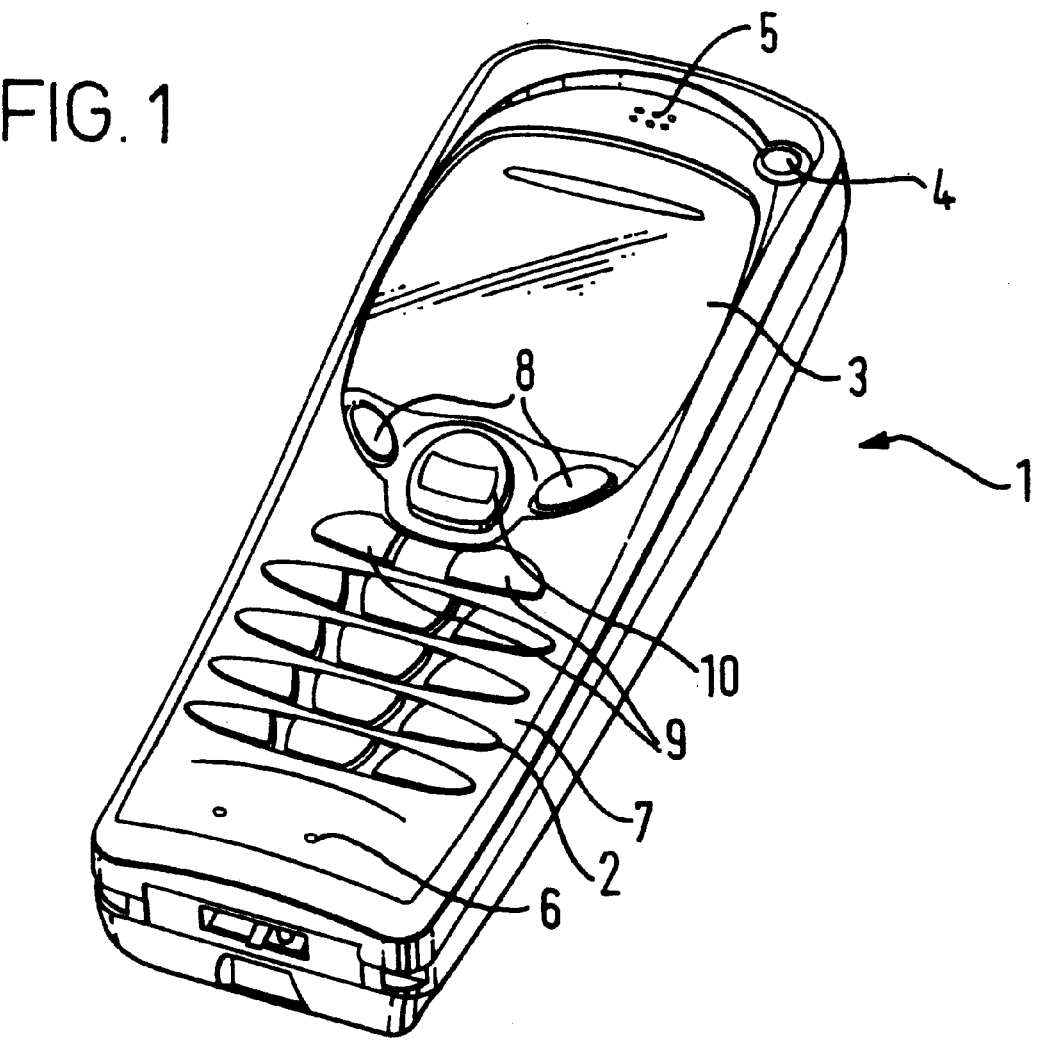
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, a speaker 5, and a microphone 6 (only openings are shown). The phone 1 according to the preferred embodiment is adapted for communication via a cellular network, but could have been designed for a cordless network as well.

According to the preferred embodiment the keypad 2 has a first group 7 of keys as alphanumeric keys, two soft keys 8, two call handling keys 9, and a navigation key 10. The present functionality of the soft keys 8 is shown in separate fields in the display 3 just above the keys 8, and the call handling keys 9 are used for establishing a call or a conference call, terminating a call or rejecting an incoming call.

Figure 2:
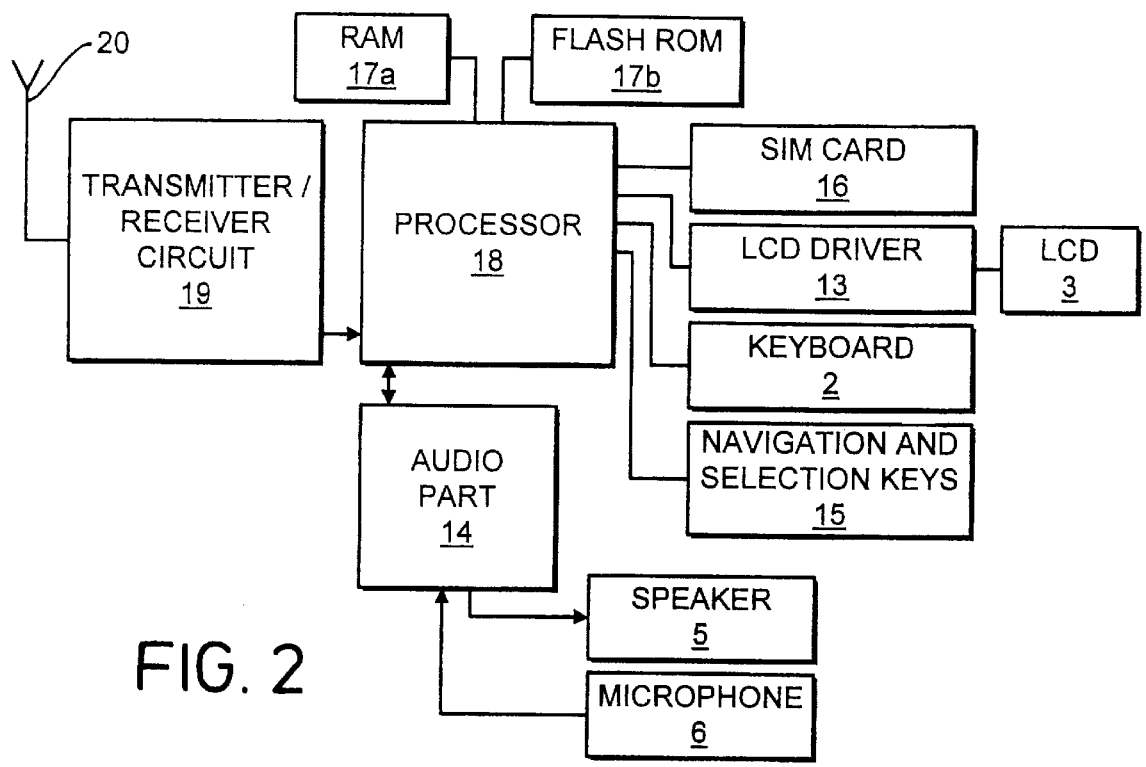
FIG. 2 schematically shows the essential parts of a telephone for communication with a cellular or cordless network.

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other phone networks. The processor 18 controls the communication with the network via the transmitter/receiver circuit 19 and an antenna 20 that will be discussed in details below.

The microphone 6 transforms the user's speech into the analog signals formed thereby are A/D converted in an AND converter (not shown) before the speech is encoded in an audio part 14. The encoded speech signal is transferred to the processor 18, which i.a. supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

The Antenna Structure

Figure 3:
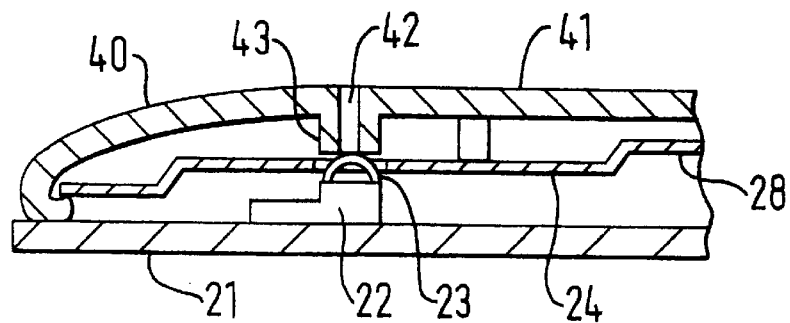
FIG. 3 shows in details the antenna feeding concept in cross-section.
Figure 4:
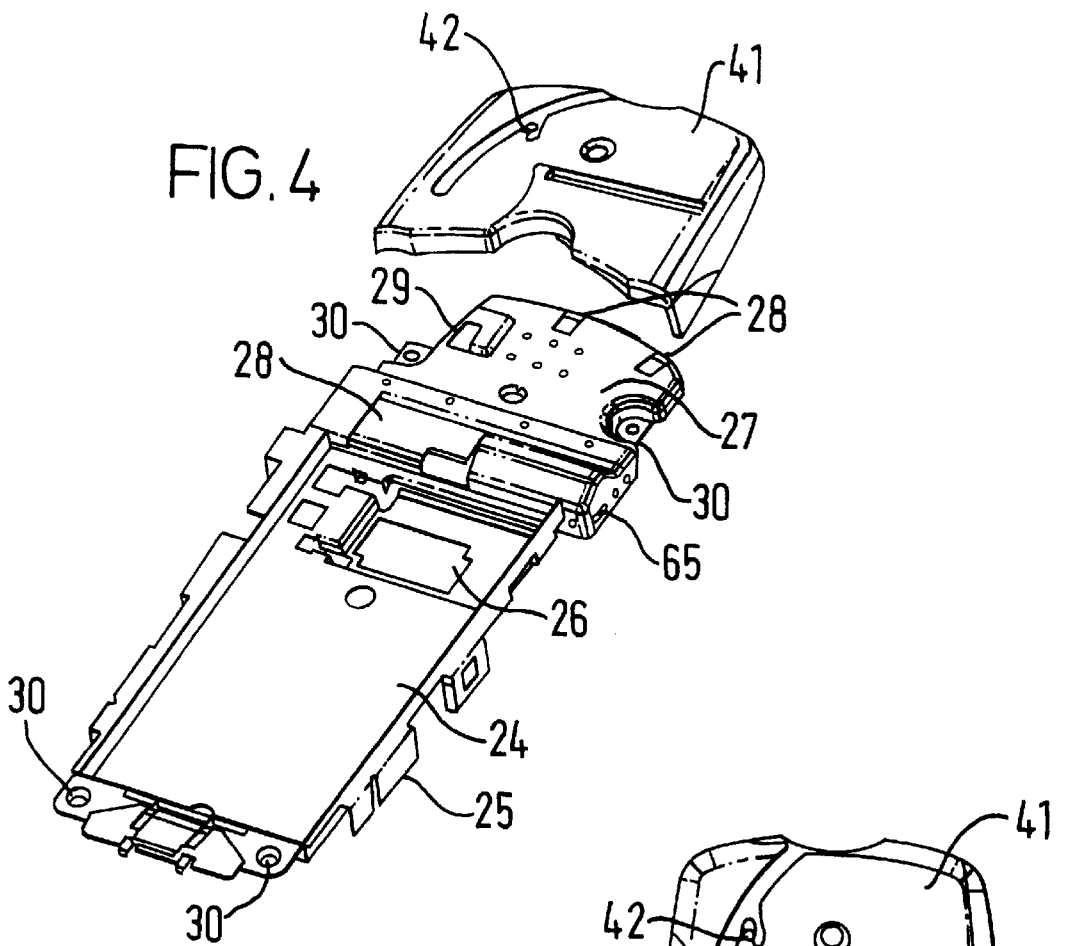
FIG. 4 shows in perspective the antenna body and the metal shield of a phone prior to assembly.
Figure 5:
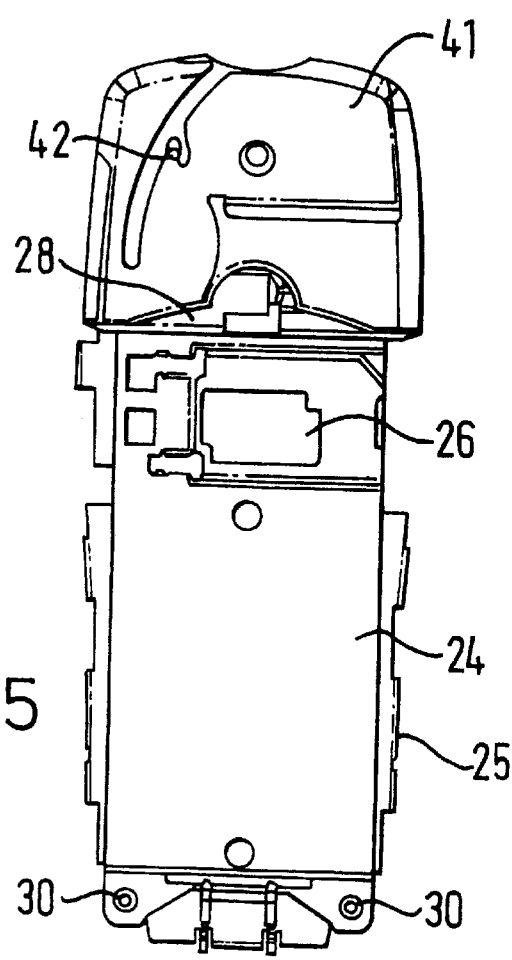
FIG. 5 shows in plan view of the antenna body and the metal shield when assembled.

As seen from FIGS. 3, 4 and 5 the preferred embodiment of the antenna device according to the invention comprises two basic parts—a shield 24 acting as ground plane for the antenna and a dielectric body 40 coated with a metallic pattern 41 where the latter acts as resonator plane. Printed Circuit Board (PCB) 21 carries a plurality of non-shown electric components, and the shield 24 is used as a per se known EMC shielding can for these components. The shield 24 is along its periphery connected to the ground of the PCB 21 and the shield 24 is therefore well suited as ground plane for the antenna. A resilient metallic leg 23 of a connector 22 is soldered onto the PCB 21 and connects a not shown RX/TX path on the PCB 21 to the antenna body part 40 via connection pin 43 having an internal metallized via 42 coherent with the metallic pattern 41.

The antenna element will be positioned in the upper rear part of the phone.

As seen from FIG. 4 the shield 24 has a number of flanges 25 for guiding the shield relatively to the cover of the phone. The shield 24 is secured to the PCB 21 by means of screws or the like passing through the holes 30. The shield 24 is furthermore provided with a punch out 26 for a not shown SIM card connector. The SIM card is placed against the edges of the punch out 26 and secured in this position by not shown locking means. In the top of the shield 24 there is provided a plane area 27 acting as ground plane for the antenna, and this area is also provided with an punch out 29 through which the antenna connector 22 extends. Furthermore the plane area 27 has two resilient spring tongues 28 used for improving the grounding of the antenna along one side (the topside) of the antenna body 40. The shield 24 is formed with a step 28 reducing the distance between the ground plane and the resonator plane in this area.

Figure 6:
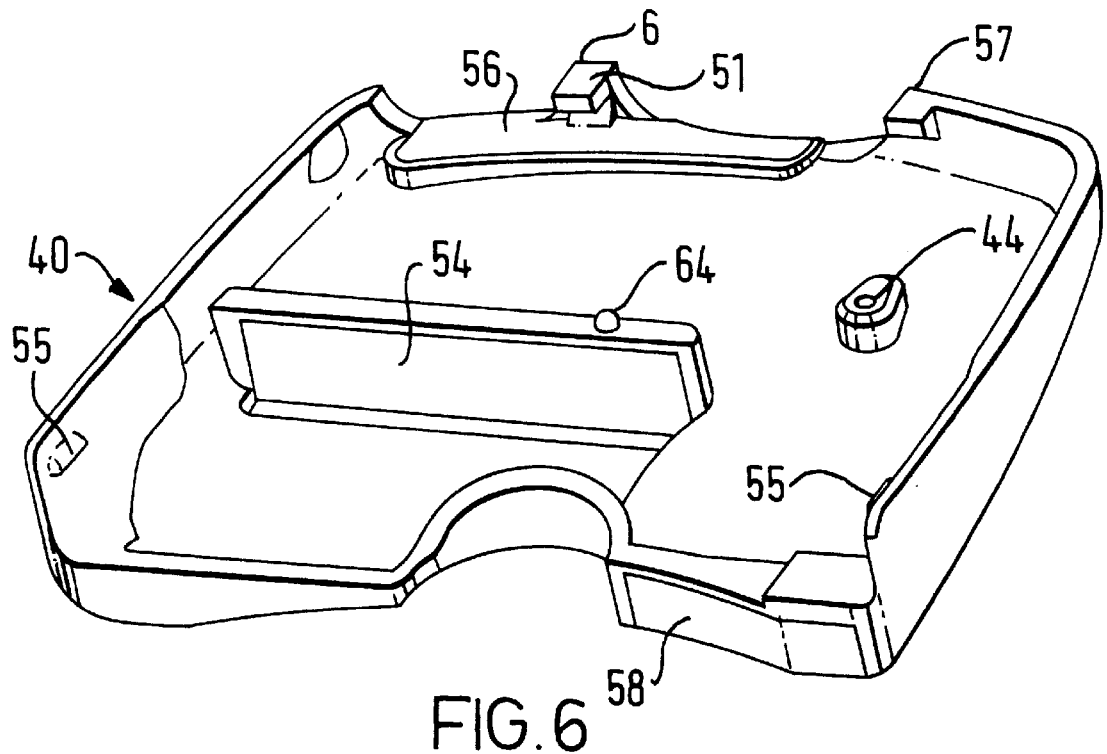
FIG. 6 shows in perspective view of the antenna body seen from below.
Figure 7:
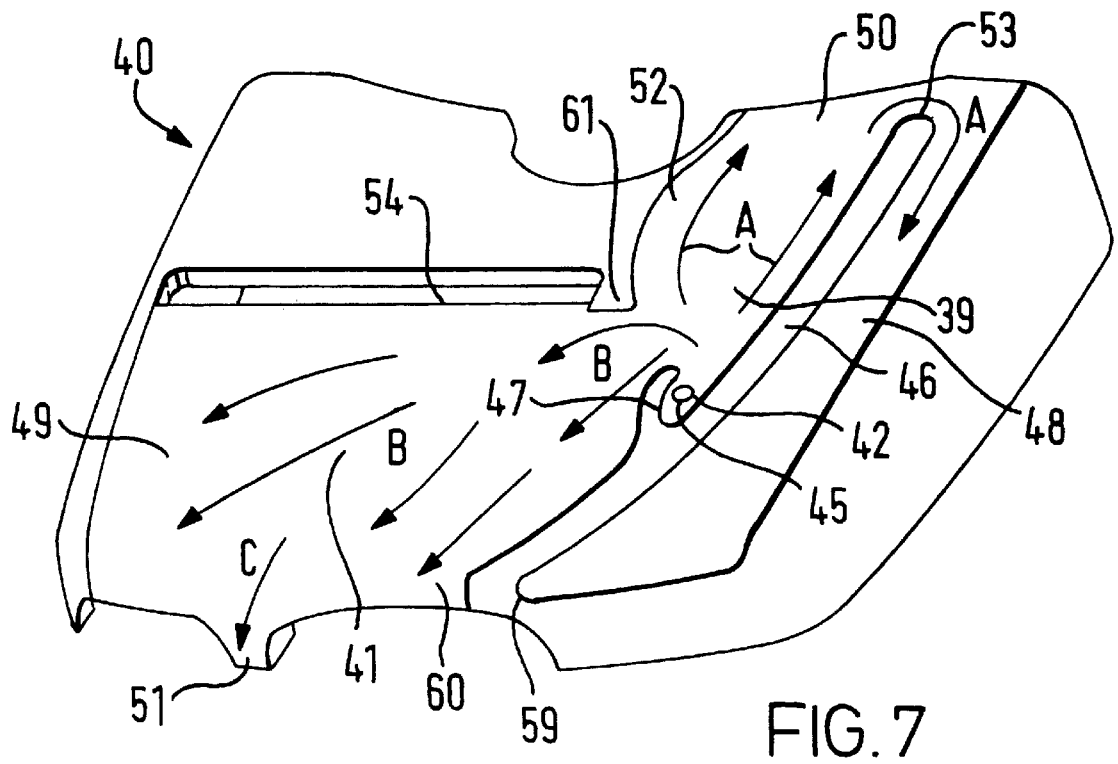
FIG. 7 shows in perspective view of the antenna body seen from above.

In FIGS. 6 and 7 the antenna body 40 is shown, and from top view (FIG. 7) it is seen that the feeding point 42 of the antenna is positioned on the tip of a tongue 45 of the metallic pattern. The feeding point 42 is provided as a plated via coming from the rear side of the antenna body 40 and transferring the RF signal between the PCB 21 and the resonator elements of the antenna. A metal island 44 surrounds the via on the top of the connection pin 43. The shape of the tip of the tongue 45 corresponds to the form of the metal island 44 in order to ease the production.

The tongue 45 on the metallic pattern 41 is defined in between a main slit 46 and a minor slit 47 branching from the mid one third of the main slit 46. The length of the main slit 46, and more in particular the circumference, has a substantial influence on the resonance frequency of the two radiating elements 48 and 49 of the antenna. The tongue 45 is coherent with the two radiating elements 48 and 49 via a common frequency part 39. The two radiating elements 48 and 49 are according to the preferred embodiment dedicated for the GSM 900 MHz band and the 1800 MHz band, respectively.

The Radiating Element in the 900 MHz Band

The surface currents on the radiating element 48 in the 900 MHz band starts from the feeding point 42 and continues along a broad passage (common frequency part 39) having a rounding 52 which allows the surface current (illustrated by arrows A) to whirl easily around the bottom 53 of the slit 46. Hereby the distribution of the surface currents becomes more evenly distributed compared to an embodiment having this passage provided with straight parallel edges. It has been observed that this rounding 52 increases the gain of the radiating element 48 in the direction normal to the radiation element.

At the end of the slit 46 there is provided a capacitive coupling 58 (FIG. 6) with the ground plane. This coupling 58 reduces the GSM 900 MHz resonance frequency. When the distance between the termination of the metallic layer and the ground plane is decreased, the capacitive coupling 58 is increased and thereby the GSM 900 MHz resonance frequency is lowered.

The circumference and thereby the length of the GSM 900 MHz resonator element 48 is determining for the GSM 900 MHz resonance frequency. This circumference of the GSM 900 MHz resonator element 48 does not affect the gain of this element.

The longer the tip 59 of the resonator element 48 is, the lower will the 900 MHz resonance frequency be. However the tip 59 must not come to close to the point 60 on the 1800 MHz resonator element 49 near the opening of the slit 46 because this will increase the coupling between the two radiating elements and the grounding point adjacent to the opening of the slit 46. If the coupling to ground from the tip 59 is increased the gain of the 900 MHz resonator element 48 will become decreased.

It has been observed that a constant width of the slit 46 and a broad ending (the width is increased towards the end) of the 900 MHz resonator element 48 gives the highest gain figures.

The length and more in particular the circumference of the slit 46 has a substantial influence on the 900 MHz resonance frequency—the longer the slit 46 is, the lower will the resonance frequency be.

The width of the slit determines both the resonance frequency and the gain. A thinner slit 46 gives a higher 900 MHz resonance frequency (partly due to the fact that the circumference is shorter, partly due to the negative coupling of opposite currents) as well as a lower overall gain (due to the negative coupling of the currents running along the two sides of the slit 46.

Normally the slit 46 will be designed for maximum gain. However it has been observed that a wide slit 46 results in a low resonance frequency and in a slightly lower gain. This might be due to the fact that the minimum width of the resonator element 48 is reduced in order to maintain the overall size of the antenna body. This will affect the ability of the resonator element 48 to guide the surface currents in an effective manner. However the width of the resonator element 48 may then be increased by letting the element 48 have an extension 68 wrapping around the smooth edge of the antenna body. This will lower the resonance frequency of the element 48 due to the increase incircumference, but the gain will be reduced, too. The gain reduction is caused by the fact that the electromagnetic field is kept inside the structure.

Figure 8:
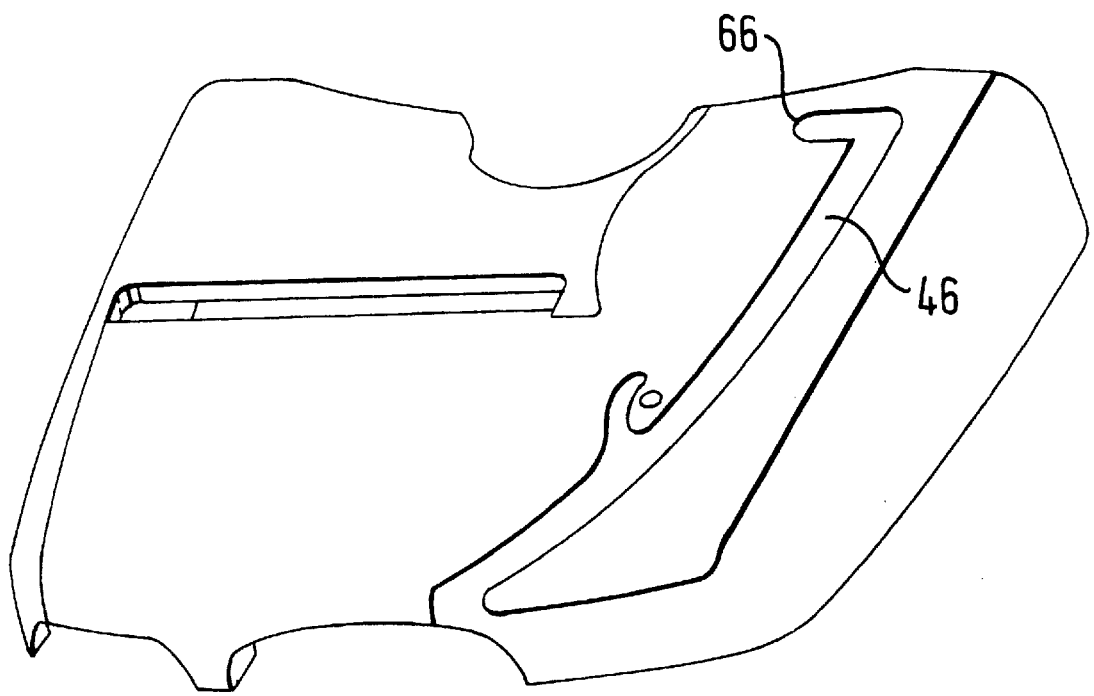
FIG. 8 shows a first alternative embodiment based on the antenna body shown in FIGS. 6 and 7.

Terminating the slit 46 in a bend portion 66 as shown in FIG. 8 may increase the resonance frequency. The angle between the main portion 46 and the bend portion 66 will preferably be around 90symbol 176\f "Symbol"\s 12°.

Figure 9:
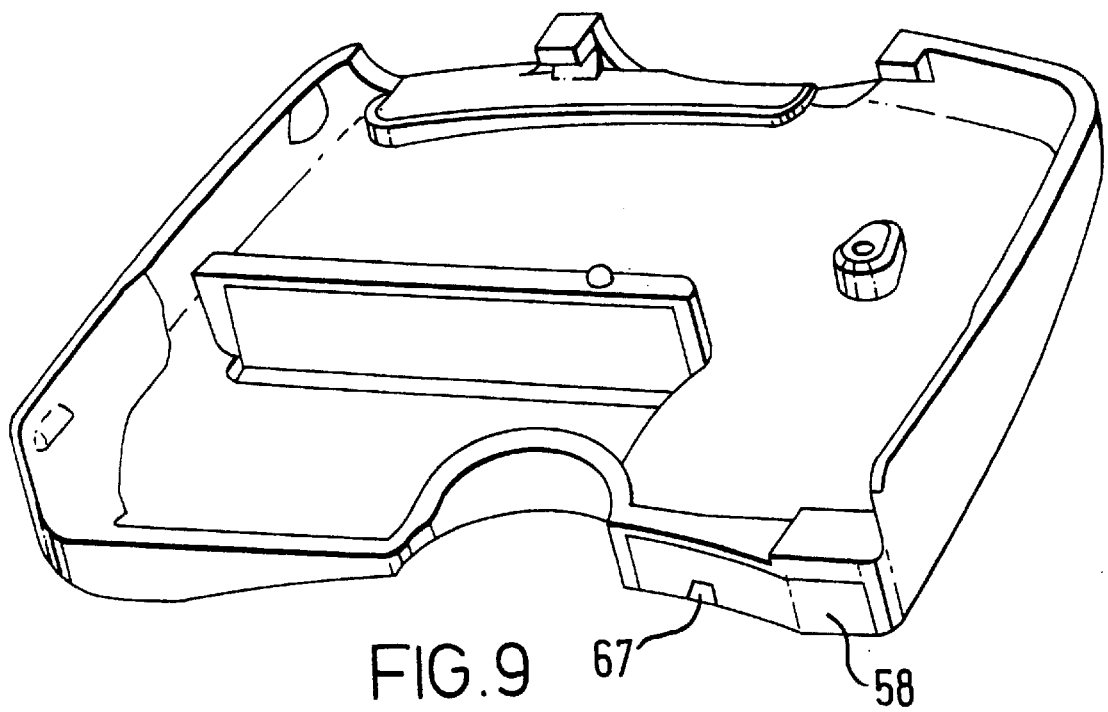
FIG. 9 shows a second alternative embodiment based on the antenna body shown in FIGS. 6 and 7.
Figure 10:
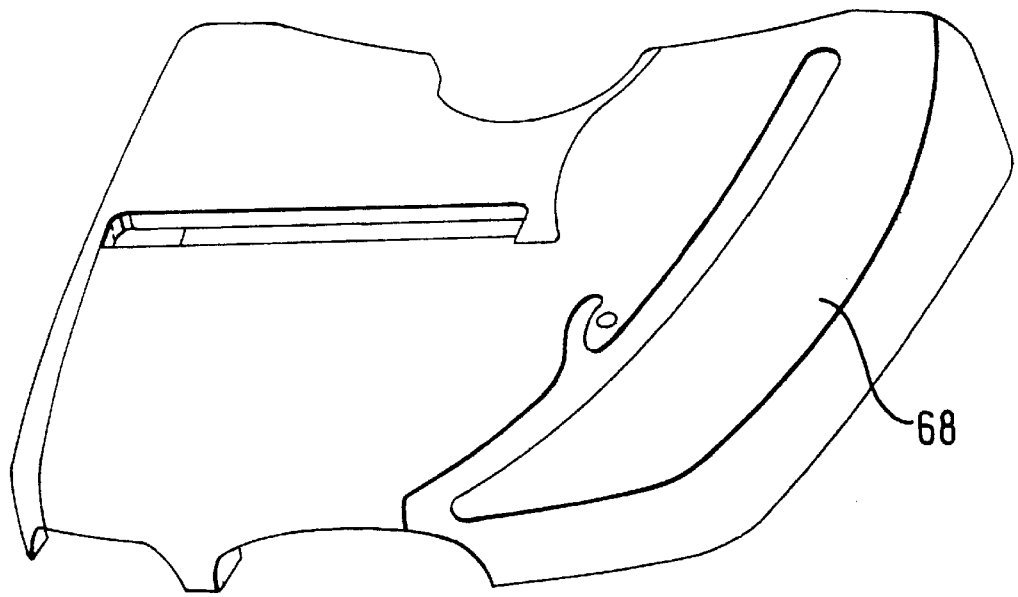
FIG. 10 shows a third alternative embodiment based on the antenna body shown in FIGS. 6 and 7.

Alternatively the slit 46 is continued as a downwardly extending portion 67 into the capacitive coupler 58 as shown in FIG. 9. This will reduce the overall gain of the 900 MHz band.

The Radiating Element in the 1800 MHz Band

The surface currents on the radiating element 49 in the 1800 MHz band starts from the feeding point 42 and passes the common frequency part 39 around the end of the second slit 47. The second slit 47 increases the bandwidth in the GSM 900 MHz band and reduces the bandwidth in the GSM 1800 MHz band. However it has been observed that the improvement of the bandwidth in the lower frequency band is higher than the bandwidth reduction in the higher frequency band. It is believed that this is due to the fact that the surface currents has to run in a quite diffuse way—see the arrows B in FIG. 7—and thus resulting in paths having different lengths, which causes the resonator element 49 to resonate at different frequencies in a continuos frequency band.

The width of this slit 47 has an impact on the bandwidth in the GSM 1800 MHz band. The wider the slit 47 is the lower will the bandwidth of the upper frequency band be. At the same time a wide slit will reduce the gain of the GSM 900 MHz band resonating element 48. Therefore the slit will be provided with a minimum width in the range 0.8 mm and with a length in the range 4.2 mm. This minimum width ensures a minimum coupling between the two resonator elements 48 and 49 and is mainly determined by the manufacturing process where a shot molding process is used according to the preferred embodiment. The length of the slit 47 determines the bandwidth of the 900 MHz band and the gain of the 1800 MHz band. The longer the slit 47 is the higher will the bandwidth in the 900 MHz band be, and the lower will the gain in the 1800 MHz band be.

A cut 61 decouples the two frequency bands by forcing the 900 MHz current not to run on a capacitive 1800 MHz coupler 54. Reducing the width of the metal pattern between the end of the slit 47 and the cut 61 will have the same effect as increasing the width of the slit 47.

The 1800 MHz band resonating element 49 is terminated in a shorting surface 56 which is biased toward the shield 24 acting as ground plane for the antenna. A metalized pin 51 lowers the resonance frequency of the 1800 MHz band and is moreover used as a gripping arm for attaching the antenna to the shield 24/PCB 21. The reason for the resonance frequency lowering is that the surface currents (the arrow C in FIGS. 6 and 7) can pass around the pin 51 before coming to ground on the rear side of the shield 24 and thus run a longer electrical distance.

Another pin 57 similar to the pin 51 is provided for fixing the antenna to the shield 24. However the pin 57 is not metalized and does only serve a mechanical purpose. In both sides of the antenna body there is provided protrusions 55 for establishing snap connection to the shield 24 having similar recesses 65.

With reference to FIG. 6 it is seen that the capacitive coupler 54 is provided as a metallic pattern part on a wall extending towards the shield 24. This coupler 54 reduces the 1800 MHz band resonance frequency—the closer to the ground plane the pattern is terminated the higher coupling there will be and this causes a lower resonance frequency.

The Antenna Body.

Basically the antenna body 40 as shown in perspective view in FIGS. 6 and 7, is provided as plastic body in a two shot molding process. According to the preferred embodiment of the invention the plastic materials used for the two shot's needs to have basically specified characteristics—primarily with regard to electrical properties of the antenna body. Advantageously the plastic material or the dielectric material for internal antenna is selected as being a crystalline polymer synthesized from styrene monomer. A surface of such a plastic body may not be coated (plated) with metal while a surface of the same plastic but provided as a compound with an appropriate catalyst may be plated.

The metallic material will adhere to the compound plastic only and a pattern useful as the strip lines for the antenna may be created. Idemitsu Petrochemical Co., Ltd. markets a dielectric material useful for the manufacturing of the antenna body 40 under the trade name XAREC®. According to the preferred embodiment two variants Xarec S-131 (GF 30%) and Xarec SP-150 (GF 30%) are used for the first and second shot, respectively. The preferred dielectric material is syndiotactic polystyrene (SPS). Alternative materials having similar properties may be used, e. g. Questra QA 802 or Catalyzed SPS RTP 4699×7900.

The required characteristics for the material in order to be used in an antenna is appropriate electrical properties, such as dielectric constant and loss factor, and an ability to keep these properties for a long time. Basically this requires that the water absorption rate is low in order to secure that the dielectric properties of the antenna remain substantially at the same level. Otherwise the absorbed water will affect the dielectric properties of the antenna body. Xarec S-131 (GF 30%) and Xarec SP-150 (GF 30%) have a water absorption/ 24 h at 0.05% according to the ASTM D 570 test method.

Basically the properties of these dielectric materials may be found from the associated data sheets. However the materials has been selected primarily due to their dielectric constant in the range 3.0–3.1 which affects the relation between the resonance wave length and the wavelength in free air. Furthermore the water absorption rate is very important because the presence of water in the dielectric material will heavily affect the dielectric properties thereof.

The Preferred Method for Manufacturing the Antenna

According to the preferred embodiment of the invention a method for manufacturing the antenna body 40 as described above will comprise steps of injection molding followed by plating steps for establishing the required metallic pattern.

Figure 11:
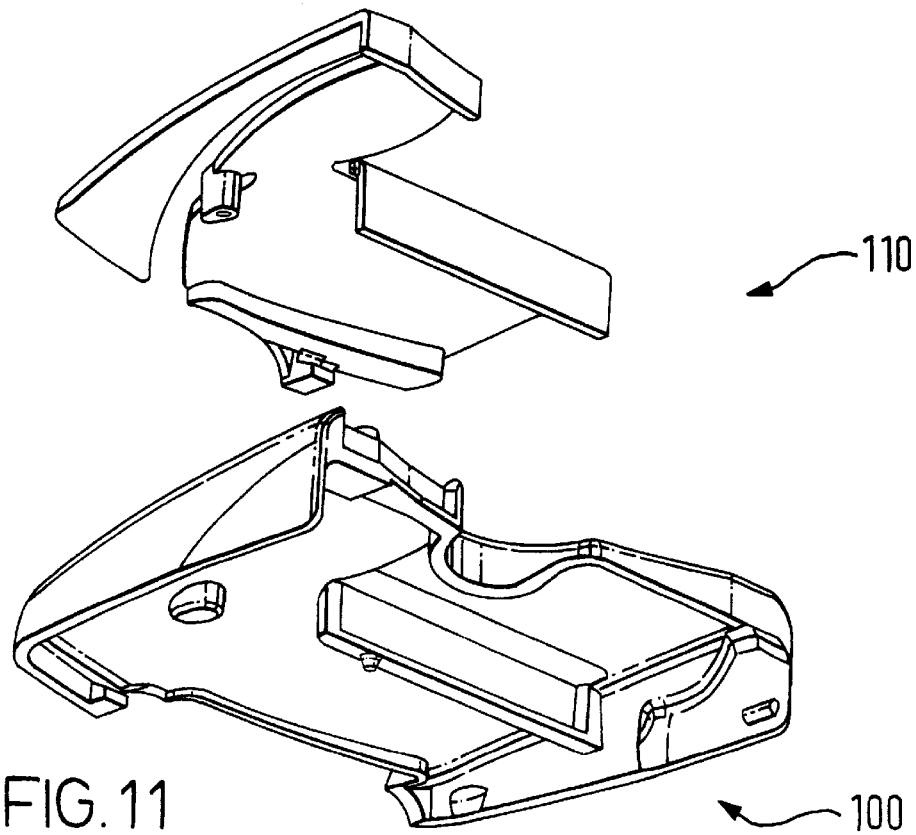
FIG. 11 illustrates the two shot mold process for manufacturing the antenna according to the invention.
Figure 14:
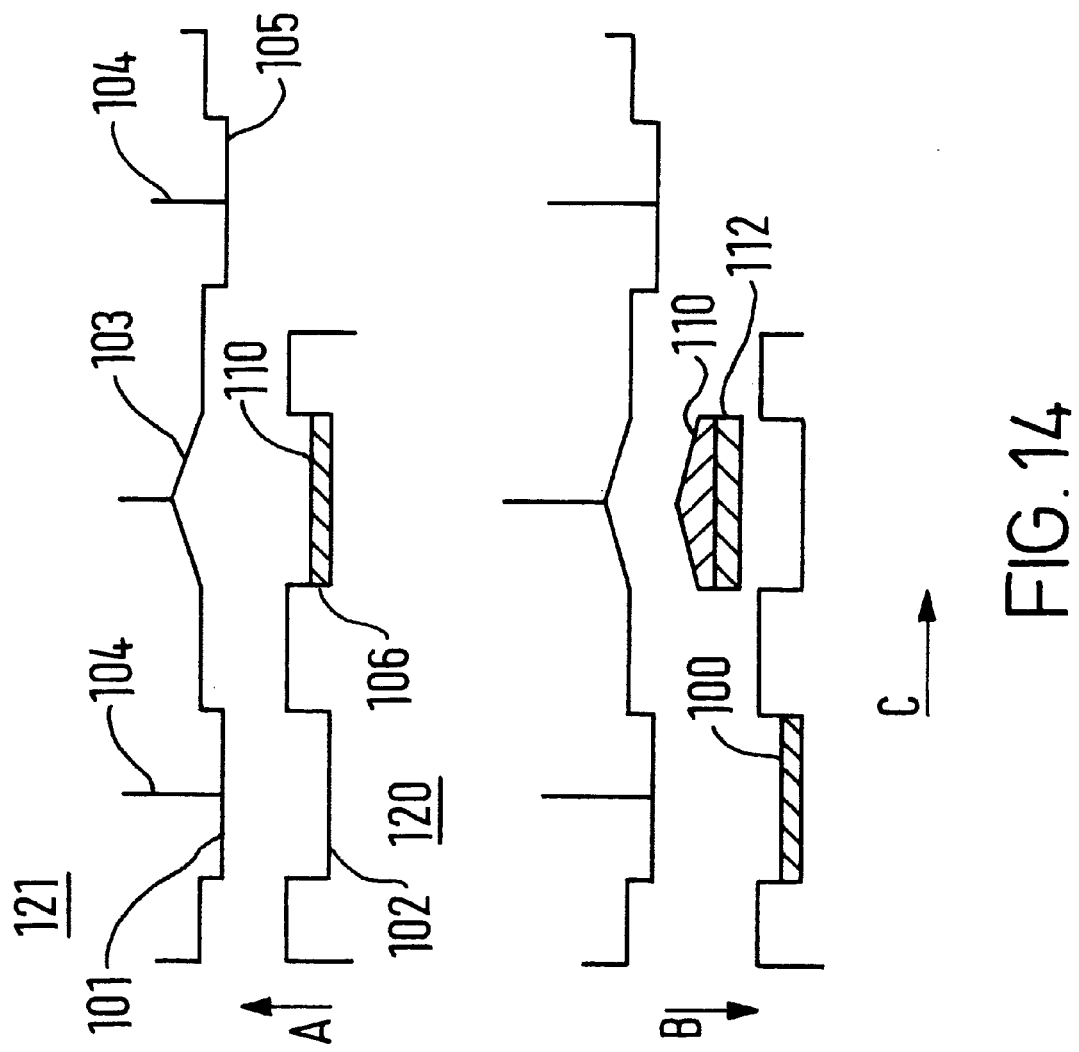
FIGS. 14(a) and (b) illustrates the preferred steps for performing the injection molding of the antenna according to the antenna.

FIG. 14 (*a*) illustrates the basic steps in the injection molding proces. As a first step the a cavity is created in between a first an a second mold part, 101 and 102 respectively. This cavity is created by moving a first tool 120 towards a second tool 121 as shown by the arrow A. The first tool 120 has a two identical mold parts (second mold parts 102 and 106), and the second tool 121 has three mold parts (a third mold part 103 and two first mold parts 101 and 105 adjecent thereto). The resin is shot (first shot) into the cavity created by the first mold part 101 and the second mold part 102 whereby a first body part 100 is created (the geometrical form of the body is simplyfied in FIG. 14 (*a*) and (*b*) compared with the actual form shown in FIG. 11 and FIG. 12). The resin used for this shot repels metal in a later metalization process. The resin is injected through an inlet 104 provided in the first mold part 101.

Then the two tools 120 and 121 are separated as indicated by the arrow B in FIG. 14(*b*), and the first body part 100 is maintained in the second mold part 102. The tool 120 is then displaced so the the second mold part 102 becomes aligned with the central third mold part 103. The tools 102 and 103 will form a cavity having the form of the final antenna body part 40 shown in FIGS. 6 and 7. However the first body part 100 fills a substantial part of this cavity whereby the residual cavity for receiving the second resin corresponds to the body part 110. The tools with the cavity in which the first body part 100 is placed is preheated whereby the second resin when shot into the cavity integrates with the first resin body to form a coherent antenna body. This coherent body is given the reference number 112. The resin used for the second shot allow metal metal to adhere in a later metalization process. The resin is injected through an inlet 104 provided in the third mold part 103.

In plating the plating process, e.g. an electroless dyp process, a 10–12 μm Cu-plating is added to the surface of an antenna body in a pattern defined by the two mold shots. The Cu-layer is finally protected by a thin Ni-layer having a thickness around 1–2 μm. The Ni-layer protects the current carrying Cu-layer. Finally the part is dipped in a chromate solution in order to passivate the Nickel surface. The metal does only adhere to the resin used in the second shot of the injection mold process.

By using this lateral displacement of the tool 120 the first resin is shot into cavity partly defined by one of the second mold parts 102 at the same time as the second resin is shot into cavity partly defined by other of the second mold parts 106. The the first resin is provided through the outlet 104 in one of the first mold parts 101 and 105, while the second resin is provided through the outlet 104 in the third mold part 103. Only the one of the first mold parts 101 and 105 that is aligned with one of the the second mold parts 102 and 106 injects resin during a shoot.

Size of the Dielectric Body

The antenna body described with reference to FIGS. 3–11 is designed as a dual band antenna for the GSM 900 MHz band and the GSM 1800 MHz band has in the preferred embodiment an overall width around 45 mm, an overall height around 37 mm and overall thickness around 9 mm. The overall length of the GSM 900 path 48 is 50–55 mm. The overall length of the GSM 1800 MHz path 49 is 20–30 mm.

Radiation Pattern

Figure 12:
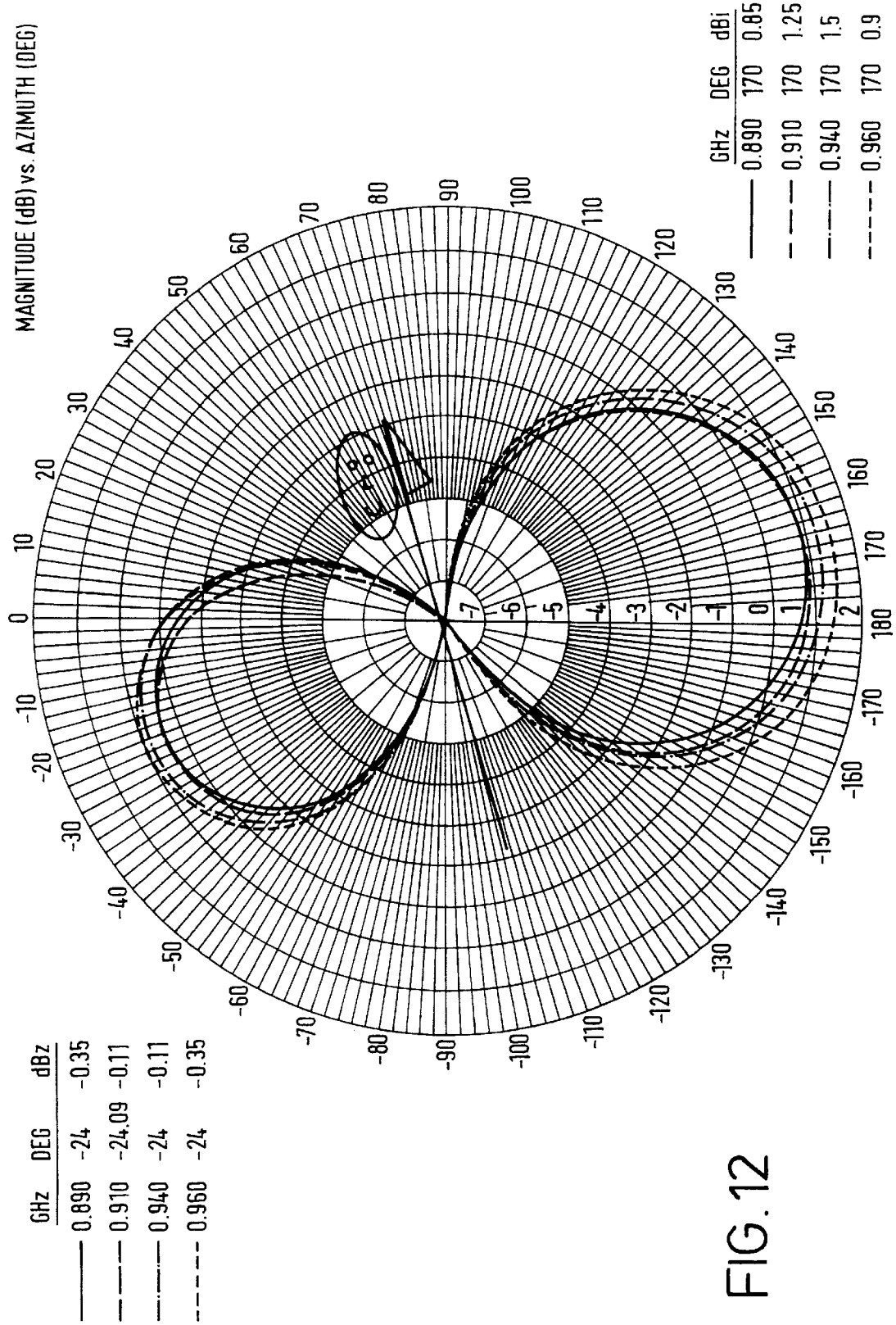
FIGS. 12 and 13 illustrates the radiation pattern for the 900 MHz band and 1800 MHz band, respectively.
Figure 13:
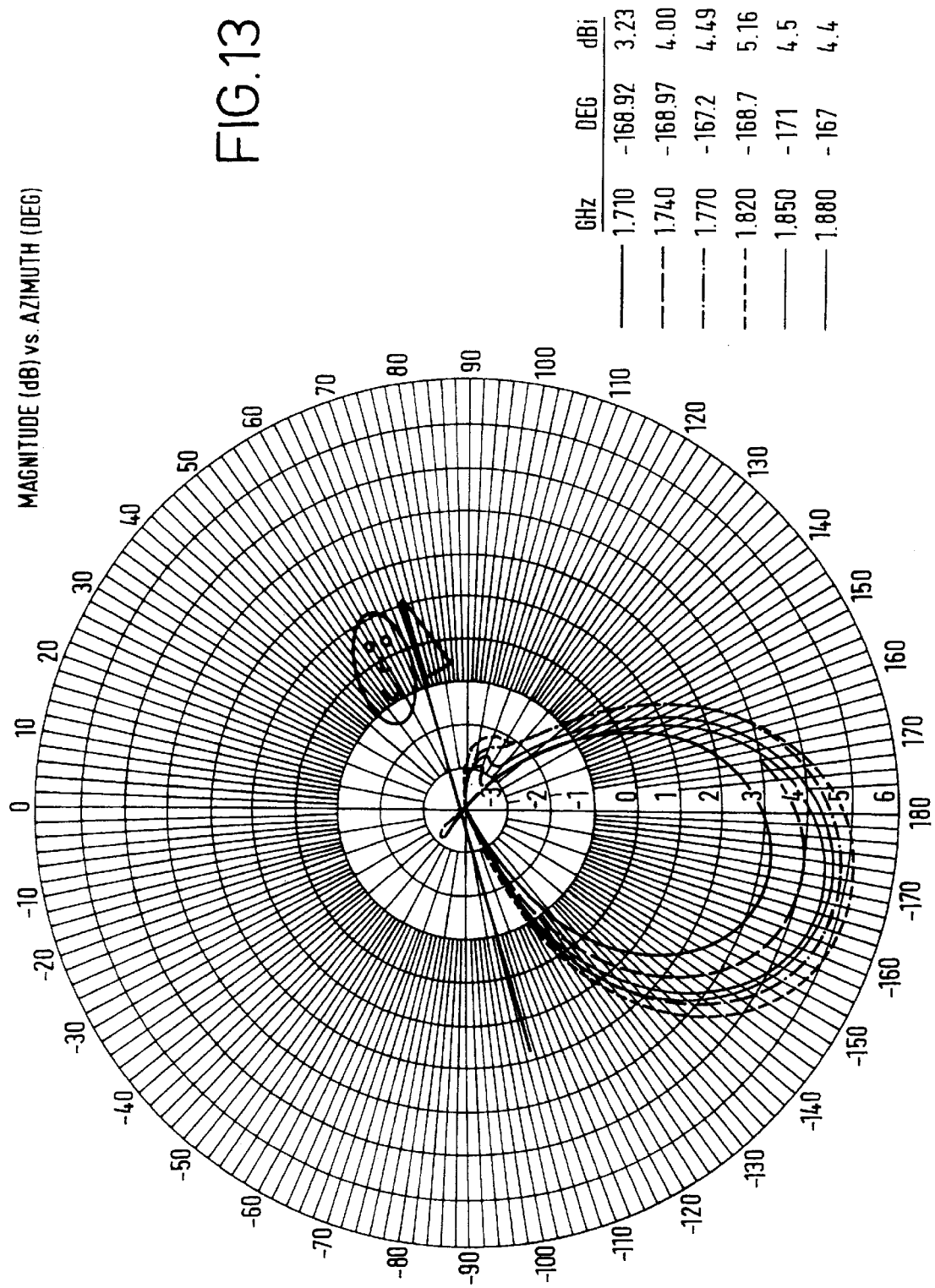

FIGS. 12 and 13 illustrates the radiation pattern for the 900 MHz band and 1800 MHz band, respectively. The $S_{11}$ minimum return loss has been measured to −17 dB for the GSM 900 MHz band and to −34 dB for the GSM 1800 MHz band. The bandwidth at $S_{11}$=−6 dB is 78 MHz (8 MHz excess) for the GSM 900 MHz band and 180 MHz (10 MHz excess) for the GSM 1800 MHz band, respectively.

The maximum gain is 1.6 dBi for the GSM 900 MHz band and 5.2 dBi for the GSM 1800 MHz band, respectively. The maximum gain at band edges is 0.8dBi for the GSM 900 MHz band and 3.23 dBi for the GSM 1800 MHz band, respectively. The estimated efficiency at centers is 70% for the GSM 900 MHz band and 60% for the GSM 1800 MHz band, respectively. The center frequencies are 925 MHz and 1795 MHz, respectively.

FIG. 12 shows that the power radiated in the GSM 900 MHz band through the rear side of the phone is 1.6 dBi, while the power radiated in the opposite direction is at least 1.6 dB lower. FIG. 13 shows that the power radiated in the GSM 1800 MHz band through the rear side of the phone is 5.2 dBi, while the power radiated in the opposite direction is almost negligible.

What is claimed is:

1. An antenna device comprising:

a first conducting layer acting as a resonator plane;

a second conducting layer arranged substantially in parallel with the first conducting layer and acting as a ground plane for the antenna device;

feeding means connected to said first and the second conducting layer for feeding an RF signal to the antenna device; wherein said first conducting layer is provided as a radiating pattern having a common frequency part coherent with at least two further parts where said common frequency part in combination with said at least two further parts defines at least two radiating elements, respectively; and capacitive couplings between the first and the second conducting layers adjacent to crossing areas between said common frequency part and the respective one of said at least two further parts, wherein said common frequency part carries currents in at least two frequency bands and therein comprises a part of said at least two radiating elements of the antenna device, the antenna device being operable in at least two frequency bands.

2. An antenna device according to claim 1, wherein the first conducting layer is coated onto a dielectric body.

3. An antenna device according to claim 2, wherein the dielectric body is provided by an injection molding process including two shots.

4. An antenna device according to claim 3, wherein the material used in one of the two injection molding shots is a resin repelling metal in a subsequent coating process, and wherein the material used in the second shot is a resin to which metal in the subsequent coating process adhere.

5. An antenna device according to claim 2, wherein the dielectric body is provided with coupling means for establishing a releasable interconnection with a separate metal body acting as the second conducting layer of the device.

6. An antenna device according to claim 2, wherein the feeding means includes a bore through the dielectric body as a connection via connecting the first conducting layer to a connection pad on the rear side of the dielectric body.

7. An antenna device according to claim 1, wherein the capacitive coupling between said first and said second conducting layers is partly obtained by reducing the distance between said first conducting layer and said second conducting layer.

8. An antenna device according to claim 7, wherein the dielectric body is provided with means for releasable interconnection with a separate metal body acting as the second conducting layer of the device, and wherein the separate metal body is provided with a stepwise raised part to establish the capacitive coupling.

* * * * *